(12) United States Patent
Bronsart et al.

(10) Patent No.: US 9,158,582 B2
(45) Date of Patent: Oct. 13, 2015

(54) METHOD FOR MANAGING THE THREADS OF EXECUTION IN A COMPUTER UNIT, AND COMPUTER UNIT CONFIGURED TO IMPLEMENT SAID METHOD

(71) Applicant: MORPHO, Issy-les-Moulineaux (FR)

(72) Inventors: Sebastien Bronsart, Issy-les-Moulineaux (FR); Matthieu Darbois, Issy-les-Moulineaux (FR); Cedric Thuillier, Issy-les-Moulineaux (FR)

(73) Assignee: MORPHO, Issy les Moulineaux (FR)

( * ) Notice: Subject to any disclaimer, the term of this patent is extended or adjusted under 35 U.S.C. 154(b) by 0 days.

(21) Appl. No.: 14/415,986

(22) PCT Filed: Jul. 17, 2013

(86) PCT No.: PCT/EP2013/065116
§ 371 (c)(1),
(2) Date: Jan. 20, 2015

(87) PCT Pub. No.: WO2014/012983
PCT Pub. Date: Jan. 23, 2014

(65) Prior Publication Data
US 2015/0242241 A1     Aug. 27, 2015

(30) Foreign Application Priority Data

Jul. 20, 2012  (FR) .................................. 12 57078

(51) Int. Cl.
| | | |
|---|---|---|
| G06F 12/00 | (2006.01) | |
| G06F 9/48 | (2006.01) | |
| G06F 13/16 | (2006.01) | |
| G06F 13/18 | (2006.01) | |
| G06F 9/30 | (2006.01) | |
| G06F 9/50 | (2006.01) | |
| G06F 13/37 | (2006.01) | |

(52) U.S. Cl.
CPC ............ *G06F 9/4887* (2013.01); *G06F 9/3009* (2013.01); *G06F 9/5016* (2013.01); *G06F 13/1663* (2013.01); *G06F 13/18* (2013.01); *G06F 13/37* (2013.01)

(58) Field of Classification Search
CPC ............ G06F 13/1663; G06F 13/1605; G06F 13/225; G06F 13/26; G06F 13/37; G06F 13/374
USPC .......................................................... 711/151
See application file for complete search history.

(56) References Cited

U.S. PATENT DOCUMENTS 6,385,701 B1 *   5/2002  Krein et al. ................... 711/141
6,604,160 B1     8/2003  Le et al.

(Continued)

FOREIGN PATENT DOCUMENTS

WO     WO 2009/058154 A1     5/2009

*Primary Examiner* — Prasith Thammavong
(74) *Attorney, Agent, or Firm* — Muncy, Geissler, Olds & Lowe, P.C.

(57) ABSTRACT

A method of managing execution threads launched by processes being executed in a computer unit having at least one calculation core connected to a shared memory. The method includes the steps of:
- using a zone of the shared memory that is accessible to all of the processes and execution threads for the purpose of managing calculation tokens;
- when a thread seeks to execute, that thread verifies that a calculation token is available;
- if a calculation token is available, the thread allocates the calculation token to itself by updating the shared memory and it continues its execution, and then releases the calculation token at the end of its execution; and
- each execution thread has a priority index allocated thereto, and each thread having a task that is being executed is caused periodically to verify that a thread has not been put on standby that has a priority index higher than its own, and where appropriate, causing the thread that is executing to stop executing and release the corresponding calculation token.

A computer unit for performing the method.

9 Claims, 1 Drawing Sheet

(56) References Cited

U.S. PATENT DOCUMENTS

| | | | |
|---|---|---|---|
| 7,325,064 B2 * | 1/2008 | Eshel et al. | 709/229 |
| 7,844,973 B1 | 11/2010 | Dice | |
| 8,041,754 B1 * | 10/2011 | Marr | 707/899 |
| 2001/0056456 A1 * | 12/2001 | Cota-Robles | 709/103 |
| 2005/0223302 A1 * | 10/2005 | Bono | 714/55 |
| 2007/0124545 A1 * | 5/2007 | Blanchard et al. | 711/152 |
| 2012/0297394 A1 * | 11/2012 | Allen | 718/103 |
| 2015/0067691 A1 * | 3/2015 | Johnson et al. | 718/103 |

* cited by examiner

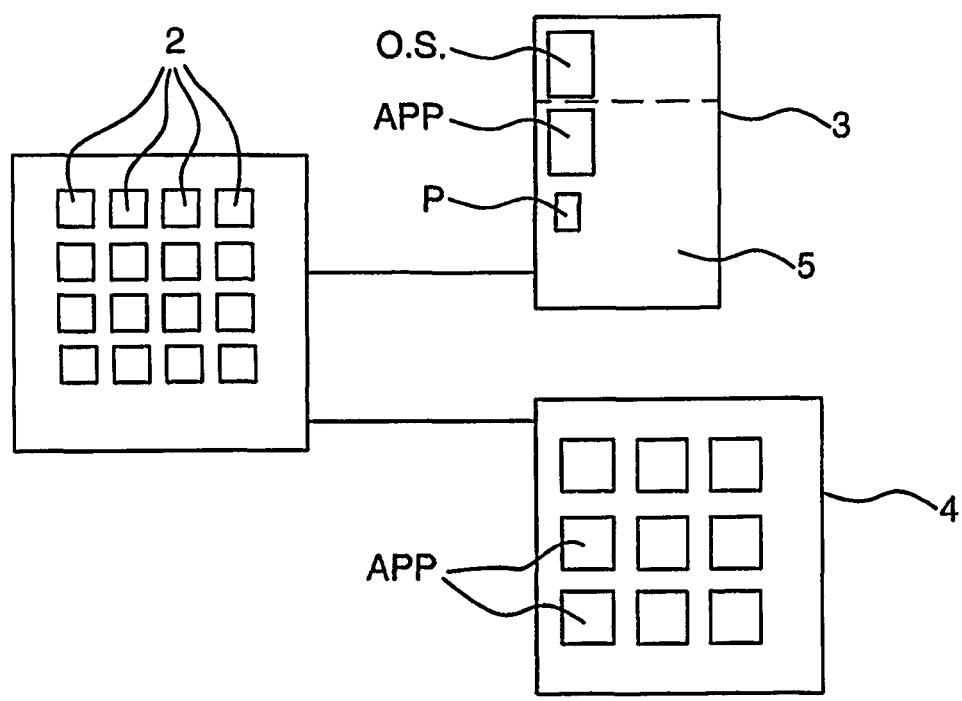

METHOD FOR MANAGING THE THREADS OF EXECUTION IN A COMPUTER UNIT, AND COMPUTER UNIT CONFIGURED TO IMPLEMENT SAID METHOD

CROSS-REFERENCE TO RELATED APPLICATIONS

This application is a 371 National Stage of PCT/EP2013/065116, filed on Jul. 17, 2013, for which priority is claimed under 35 U.S.C. §120; and this application claims priority of Application No. 1257078 filed in France on Jul. 20, 2012 under 35 U.S.C. §119, the entire contents of all of which are hereby incorporated by reference.

BACKGROUND OF THE INVENTION

The present invention relates to a method of managing execution threads launched by computer processes within a computer unit. The invention also provides a computer unit for performing the method.

A computer unit, such as the central processor unit of a personal computer, of a server, or of a workstation, generally has at least one calculation core connected to a memory containing an operating system (O.S.) and applications.

The execution of an instance of one of these applications gives rise to a process being executed within the unit. Each process may give rise to one or more threads being executed, which threads share the memory of the parent process. For simplification purposes, the term "thread" is used herein to describe code portions that can be executed concurrently, regardless of whether they are the code of processes, or the code of threads created by processes.

High-performance computer units have increasing numbers of calculation cores enabling threads to be executed in parallel. The scheduling of various threads that can make use of the performance of a plurality of cores and the launching of tasks that have different priorities and durations is an operation that is relatively complex, and difficult to calculate and incorporate for the purpose of optimizing both computation streams and response times. In order to retain some control over execution durations and management of priorities, it is generally necessary to have recourse to a so-called "real time" scheduling program. This gives rise to a loss of flexibility in the operation of the computer unit and is expensive to develop.

Certain fields require high levels of computation power, such as for example processing information in databases of very large size, and it is common practice to use computer systems that group together a plurality of multi-core computer units, each of which has access to a portion of the database. In such fields, it can be understood that optimizing the load on the calculation cores with each computer unit serves to reduce the number of computer units needed by the computer system and thus to reduce the cost of the system. Reducing the costs of a system is thus a major target.

BRIEF SUMMARY OF THE INVENTION

An object of the invention is to provide means for enabling a computer unit to manage execution threads.

To this end, the invention provides a method of managing execution threads launched by processes being executed in a computer unit having at least one calculation core connected to a shared memory, the method being characterized in that it comprises the steps of:

using a zone of the shared memory that is accessible to all of the processes and execution threads for the purpose of managing calculation tokens;

when a thread associated with a task seeks to execute, causing the thread to verify whether a calculation token is available;

if a calculation token is available, causing the thread to allocate itself the calculation token by updating the shared memory, followed by the thread executing, and then by the thread releasing the calculation token at the end of its execution;

if no token is available, causing the thread for execution to go on standby until a calculation token is released by a thread that has terminated its execution;

when a calculation token is released by a thread, causing that thread to identify the next thread to which the token is to be transferred, and to transfer the token thereto, where appropriate; and each execution thread has a priority index allocated thereto, and each thread having a task that is being executed is caused periodically to verify that a thread has not been put on standby that has a priority index higher than its own, and where appropriate, causing the thread that is executing to stop executing and release the corresponding calculation token.

Thus, the scheduling of threads does not result in calculation being performed but in calculation tokens being allocated to threads requesting execution and to calculation tokens being released by threads at the end of execution. This gives rise to scheduling that is the result of co-operation between the processes and the threads. This scheduling also requires few resources and does not call on the scheduler of the operating system.

The invention also provides a computer unit for performing the method.

Other characteristics and advantages of the invention appear on reading the following description of a particular non-limiting implementation of the invention.

BRIEF DESCRIPTION OF THE DRAWING

Reference is made to the sole accompanying FIGURE, which is a diagrammatic view of a computer unit in accordance with the invention.

DETAILED DESCRIPTION OF THE INVENTION

The invention relates to a method of managing threads launched by processes that are being executed in a computer unit, and to a computer unit for performing the method.

With reference to the FIGURE, the computer unit comprises in conventional manner: a data processor module 1 having calculation cores 2, there being sixteen of them in this example, and connected to a random access memory (RAM) 3 and a read only memory (ROM) 4 containing a management program or "operating system" O.S. and also containing application programs APP. The RAM 3 includes at least one shared zone 5 that is accessible to all of the application programs APP. It goes without saying that the computer unit has other components such as an input/output device, man/machine interfaces, etc., that are neither described nor shown since they do not have any direct bearing on the invention.

The operation of the computer unit is conventional, namely programs are loaded in the RAM 3 in order to be executed by the processor module and more precisely by the calculation cores 2. These programs comprise sequences of tasks that are executed on one or more threads. The execution of the processes thus leads to successive and/or simultaneous launching of threads that are in competition for being executed by the calculation cores 2.

The computer unit is arranged to perform a method of managing these threads.

The method begins by a step of loading a data entity P into the shared zone 5 of the RAM 4, which data entity serves to manage a number of calculation tokens, which in this example is a function of the predetermined number of calculation cores 2. This data is generally loaded by the first execution thread requesting a calculation token. For this purpose, each process is arranged to verify whether the data entity P for managing calculation tokens is present in the RAM, and if not, to load it into RAM.

If no calculation token is available, the execution thread updates the data entity P in order to indicate its desire to recover a token, and then goes on standby until a calculation token is released by another thread that has terminated execution. If a calculation token is available, the thread updates the data entity P in order to indicate that it is allocating itself the calculation token, and it continues with execution. At the end of execution of the thread, the thread releases the calculation token by updating the data entity P, and where appropriate by informing another thread on standby that a token is available.

Provision is made to allocate a priority index to each thread. Each thread is arranged to verify periodically that some other thread has not been put on standby even though it has a higher priority index than its own, and where appropriate to release its own token in order to allocate it to the higher priority thread, after which it puts itself on standby for a new token.

Advantageously, each process having a thread that is being executed periodically signals that it is active via the memory data entity P, which maintains an up-to-date list of registered processes that are being executed. At some specified moment, one of the registered processes releases the calculation token(s) of a registered process that has failed to signal that it is active. This serves to release tokens that are allocated to a process for which operation has failed, for example that might have terminated its execution prematurely without returning its tokens.

Also advantageously, in a preferred implementation, the method includes a step of making provision to allocate a limited number of calculation tokens to a process or to a group of processes. This makes it possible to ensure that the process or group of processes does not monopolize too great a number of calculation cores, thereby allowing other processes to be executed on the calculation cores that remain. This is advantageous for non-priority processes that are resource-greedy.

It is also possible to reserve at least one calculation token for at least one process. This is particularly advantageous when there are critical processes that must be capable of being executed at any time.

These allocation restrictions (limitation or reservation) are stored in the memory containing the data entity P.

The method of the invention preferably includes a step of authorizing a program to access the shared zone 5. By way of example, this program is a program for collecting information suitable for use for statistical purposes or else it is a debugging program.

Naturally, the invention is not limited to the embodiments described, but covers any variant coming within the ambit of the invention as defined by the claims.

In particular, the method of the invention may be performed in a manner that is different from that described herein, i.e. without the options and variants mentioned in the description.

The number of calculation tokens may be independent of the number of calculation cores 2 in the computer system.

The invention claimed is:

1. A method of managing execution threads launched by processes being executed in a computer unit having at least one calculation core connected to a shared memory, the method comprising the following steps:
  using a zone of the shared memory that is accessible to all of the processes and execution threads for the purpose of managing calculation tokens;
  when a thread associated with a task seeks to execute, causing the thread to verify whether a calculation token is available;
  if a calculation token is available, causing the thread to allocate itself the calculation token by updating the shared memory, followed by the thread executing, and then by the thread releasing the calculation token at the end of its execution;
  if no token is available, causing the thread for execution to go on standby until a calculation token is released by a thread that has terminated its execution;
  when a calculation token is released by a thread, causing that thread to identify the next thread to which the token is to be transferred, and to transfer the token thereto, where appropriate; and
  each execution thread has a priority index allocated thereto, and each thread having a task that is being executed is caused periodically to verify that a thread has not been put on standby that has a priority index higher than its own, and where appropriate, causing the thread that is executing to stop executing and release the corresponding calculation token.

2. A method according to claim 1, wherein each process having a thread that is executing periodically indicates that it is active by means of the shared memory zone which maintains an up-to-date list of processes having a thread that is being executed, and one of these processes releases the calculation token of a registered process that has failed to signal that it is active.

3. A method according to claim 1, wherein each process is capable of loading into memory the data entity enabling calculation tokens to be managed and the calculation token data entity is loaded into memory by the first process seeking to execute in the context of a session and is unloaded at the end of execution of the last process to be executing.

4. A method according to claim 1, including a step of providing an allocation of a limited number calculation tokens to at least one process.

5. A method according to claim 1, including a step of reserving at least one calculation token for at least one process.

6. A method according to claim 1, including a step of authorizing a program to access the shared zone.

7. A method according to claim 6, wherein the program is a program for collecting information suitable for use for statistical purposes.

8. A method according to claim 6, wherein the program is a debugging program.

9. A computer unit including at least one calculation core connected to a memory and arranged to execute processes, the computer unit wherein it is arranged to perform the method as described in claim 1.

* * * * *